BEST AVAILABLE COPY

G. ESTERLY.

Harvester.

2 Sheets—Sheet 1.

No. 3,957.

Reissued May 3, 1870.

Witnesses.

Robt Vanorm

W. Blake

Inventor

J. F. Seberling

G. ESTERLY.

2 Sheets—Sheet 2.

Harvester.

No. 3,957.

Reissued May 3, 1870.

Witnesses
Milton Howe
D B Mary

Assignee of the Inventor
J H Liberling

N. PETERS, Photo-Lithographer, Washington, D.C.

UNITED STATES PATENT OFFICE.

JOHN F. SEIBERLING, OF AKRON, OHIO, ASSIGNEE OF GEORGE ESTERLY.

IMPROVEMENT IN HARVESTERS.

*Specification forming part of Letters Patent No.* 23,666, *dated April* 19, 1859; *reissue No.* 3,957, *dated May* 3, 1870.

CASE C.

*To all whom it may concern:*

Be it known that GEORGE ESTERLY, of Whitewater, in the county of Walworth and State of Wisconsin, has heretofore invented a new and Improved Combined Automatic Rake and Harvester; and I do hereby declare that the following is a full, clear, and exact description of that part of said ESTERLY'S invention which forms the subject-matter of this division of reissue, reference being had to the accompanying drawings, making a part of this specification, in which—

Figure 1:
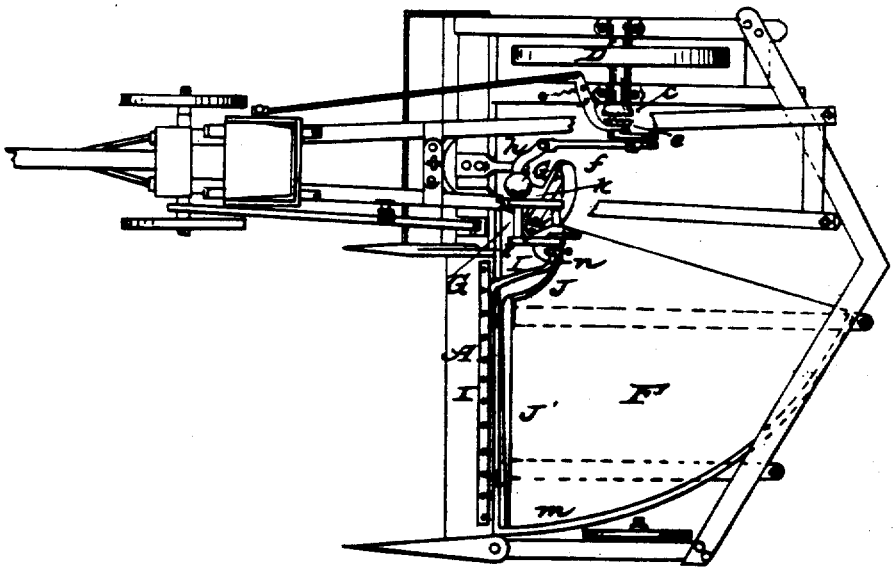
Figure 2:
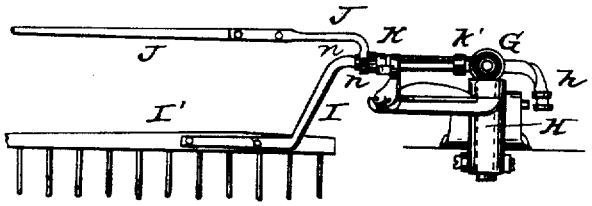
Figure 3:
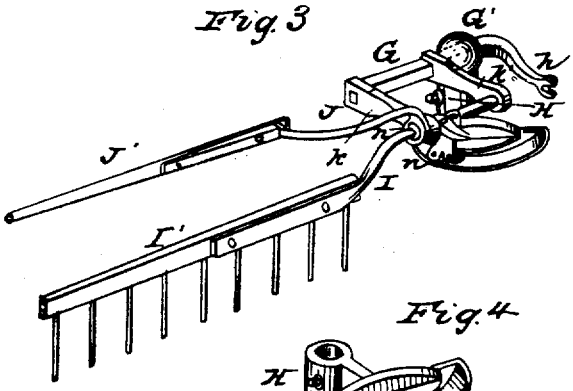
Figure 4:
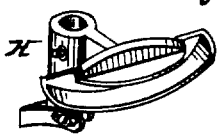

Figure 1 represents a top view of so much of said ESTERLY'S machine as is necessary to illustrate the invention forming the subject-matter of this division of reissue. Fig. 2 represents a back view of the automatic rake and grain-supporting finger detached; and Fig. 3 represents a perspective view of the parts shown in Fig. 2. Fig. 4 represents a perspective view of the rake-guiding camways and tubular stand.

To enable those skilled in the art to make and use the said ESTERLY'S invention, I will proceed to describe the same more in detail.

The nature of that part of said ESTERLY'S invention which forms the subject-matter of this division of reissue consists, first, in an adjustable guard or separating finger, supported at one end only, and arranged to vibrate over the platform in a circular horizontal path, substantially as hereafter set forth; second, in a single bar or rod, supported by and capable of being turned upon a horizontal axis or journal, arranged over or nearly over the inner front corner of the platform, for holding the grain-separating finger; third, in a rod or bar for supporting the grain-separating finger at one end only, which can be turned upon an axis or journal to adjust the grain-separating finger at different heights above the platform, to suit different heights of grain to be cut.

In the drawings, A represents the finger-beam, to the rear of which is secured the platform F, and over which platform the rake I′ is arranged to sweep and discharge the cut grain therefrom in gavels upon the ground, the rake being operated by the mechanism shown in the drawings, all as fully described and set forth in another division of this reissue.

The rake I′ is of sufficient length to extend to the ledge or fender *m* on the outer edge of the platform F, or as near as may be without coming in contact therewith. The rake I′ is attached to and supported by the lower end of the bent shaft I, the upper horizontal part of said shaft being fitted to turn freely in bearings in the ends of the arms *k k′*, which in turn are supported by the arm G, to the bent end *h* of which the connecting-rod *f* is attached, and by means of which the rake is moved back and forth over the platform when the machine is in motion, and the hub of crank *e* is in clutch with the hub *c*, attached to the shaft of the main wheel D. It may be observed that arm G is secured to the upper end of spindle G′, which turns in a tubular bearing or socket-piece, H.

From the outer side of the arm *k* projects a collar, *n*, upon which is secured a bar or rod, J, by means of a set-screw, *n′*. To the outer end of the bar or rod J is fastened the grain-gavel or separating-fingers or rod J, which is about equal to the rake in length, and is parallel with it.

By turning the bar J on its axis or journal the grain-supporting finger J′ can be adjusted above the rake and platform at a greater or less height, as occasion may require, to suit the different heights of grain to be cut.

It will be observed that the grain-supporting rod or finger J′ is moved in the arc of a circle when it is adjusted, the center of which is the axis of motion of the bar or rod J by which it is supported, and which axis of motion is parallel with the upper side of the platform, and at right angles with the line of motion of the machine when the grain-guard is in position for supporting the falling grain at the commencement of the movement of the grain from the platform to form a gavel.

It will be observed that the grain-guard or separating-finger J′ will prevent the falling grain from falling on the rake, or upon the grain which is being discharged from the platform, and that it is supported by a single bar or rod, the journal of which is located over or near the inner front corner of the platform, and that by adjusting said finger supporting bar or rod upon its axis, the grain-separating finger or rod can be raised and lowered parallel with the surface of the upper sides of the finger-beam and platform, for supporting stalks of grain of different heights, as occasion may require. When the grain-separating finger is moved back the stalks of grain which it had previously supported are allowed to fall upon the platform to form a new gavel, and when it is moved forward again it will be interposed between the stalks of grain lying on the platform and those being cut, whereby the grain can be conveniently cut and discharged upon the ground in gavels, as before stated.

Having described that part of the said invention which forms the subject-matter of this division of reissue, what is claimed as the invention of the said GEORGE ESTERLY, and desired to have secured by Letters Patent, is—

1. An adjustable guard or separating-finger, supported at one end only, and arranged to vibrate over the platform in a circular horizontal path, substantially as set forth.

2. A single bar or rod supported by and capable of being turned upon a horizontal axis or journal, arranged over or nearly over the inner front corner of the platform, for holding the grain-separating finger.

3. A rod or bar for supporting the grain-separating finger at one end only, which can be turned upon a horizontal axis or journal to adjust the grain-supporting finger at different heights above the platform, to suit different heights of grain to be cut.

J. F. SEIBERLING.

Witnesses:
ROBT. VAN ORM,
W. S. CLARK.